United States Patent
Kaimer et al.

(10) Patent No.: US 11,312,352 B2
(45) Date of Patent: Apr. 26, 2022

(54) METHOD FOR IMPROVING THE DRIVING DYNAMICS OF A VEHICLE AND DRIVE DEVICE SUITABLE FOR PERFORMING THE METHOD

(71) Applicant: MAGNA POWERTRAIN GMBH & CO KG, Lannach (AT)

(72) Inventors: Simon Kaimer, Fernitz (AT); Martin Parigger, Brodingberg (AT); Johannes Quehenberger, Raaba (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 383 days.

(21) Appl. No.: 16/332,832

(22) PCT Filed: Sep. 11, 2017

(86) PCT No.: PCT/EP2017/072760
§ 371 (c)(1),
(2) Date: Mar. 13, 2019

(87) PCT Pub. No.: WO2018/050599
PCT Pub. Date: Mar. 22, 2018

(65) Prior Publication Data
US 2019/0359197 A1    Nov. 28, 2019

(30) Foreign Application Priority Data
Sep. 14, 2016  (DE) .................. 10 2016 217 550.5

(51) Int. Cl.
*B60W 10/10* (2012.01)
*B60B 35/14* (2006.01)
(Continued)

(52) U.S. Cl.
CPC ............. *B60W 10/10* (2013.01); *B60B 35/14* (2013.01); *B60K 7/0007* (2013.01);
(Continued)

(58) Field of Classification Search
CPC ...... B60W 10/10; B60W 10/08; B60W 30/18; B60W 2400/00; B60W 2520/10;
(Continued)

(56) References Cited

U.S. PATENT DOCUMENTS

| 2010/0025131 A1 | 2/2010 | Gloceri et al. |
| 2013/0030636 A1 | 1/2013 | Sugata |

(Continued)

FOREIGN PATENT DOCUMENTS

| DE | 4434237 A1 | 3/1996 | |
| DE | 102005026874 A1 * | 12/2006 | ............ B60W 10/06 |

(Continued)

OTHER PUBLICATIONS

International Search Report and Written Opinion dated Dec. 15, 2017 from corresponding International Patent Application No. PCT/EP2017/072760 with English translation of International Search Report.

(Continued)

*Primary Examiner* — Maceeh Anwari
*Assistant Examiner* — Charles Pall
(74) *Attorney, Agent, or Firm* — Dickinson Wright PLLC

(57) ABSTRACT

The present invention relates to a method with which the driving dynamics of an electrically driven vehicle can be modified. Within the scope of the method according to the invention, a vehicle operating characteristic variable, as a function of which a torque transmission mechanism is engaged, is monitored, by means of which torque transmission mechanism two half-shaft assemblies of the vehicle which are each driven by an electric motor can be selectively connected to one another in terms of drive.

14 Claims, 6 Drawing Sheets

(51) Int. Cl.
  *B60K 7/00* (2006.01)
  *B60L 15/20* (2006.01)
  *B60W 10/08* (2006.01)
  *B60W 30/18* (2012.01)

(52) U.S. Cl.
  CPC ......... *B60L 15/2054* (2013.01); *B60W 10/08* (2013.01); *B60W 30/18* (2013.01); *B60L 2240/423* (2013.01); *B60W 2400/00* (2013.01); *B60W 2520/10* (2013.01); *B60W 2520/14* (2013.01); *B60W 2540/18* (2013.01); *B60W 2710/105* (2013.01); *B60Y 2200/91* (2013.01)

(58) Field of Classification Search
  CPC ......... B60W 2520/14; B60W 2540/18; B60W 2710/105; B60B 35/14; B60K 7/0007; B60L 15/2054; B60L 2240/423; B60Y 2200/91
  See application file for complete search history.

(56) References Cited

U.S. PATENT DOCUMENTS

2016/0207421 A1* 7/2016 Nogi .................. B60L 7/28
2017/0097055 A1* 4/2017 Shibata ............... B60W 20/30

FOREIGN PATENT DOCUMENTS

| DE | 102005026874 A1 | | 12/2006 | |
|----|----|----|----|----|
| DE | 102009055160 A1 | | 6/2011 | |
| DE | 102015216689 A1 | * | 3/2016 | ........... B60W 20/15 |
| DE | 102015216689 A1 | | 3/2016 | |

OTHER PUBLICATIONS

German Search Report dated May 24, 2017 from corresponding German Patent Application No. 102016217550.5.

* cited by examiner

METHOD FOR IMPROVING THE DRIVING DYNAMICS OF A VEHICLE AND DRIVE DEVICE SUITABLE FOR PERFORMING THE METHOD

CROSS-REFERENCE TO RELATED APPLICATIONS

This application is a National Stage of International Application No. PCT/EP2017/072760, filed Sep. 11, 2017, which claims the benefit and priority to German Patent Application No. DE 10 2016 217 550.5 filed Sep. 14, 2016. The entire disclosures of each of the above applications are incorporated herein by reference.

FIELD OF THE INVENTION

The present invention relates to a method for modifying, in particular for improving, the driving dynamics of an at least partially electrically driven vehicle, and to a drive device for an at least partially electrically driven vehicle, which drive device is designed for carrying out the method according to the invention.

BACKGROUND OF THE INVENTION

This section provides information related to the present disclosure which is not necessarily prior art.

In order to modify the driving dynamics of vehicles which are driven by means of an internal combustion engine, what is referred to as torque vectoring is known, by means of which the yaw angle or the yaw speed of the vehicle can be actively influenced. This is achieved in that different portions of the drive torque of the internal combustion engine are intentionally divided between the right-hand wheel and the left-hand wheel of a driven axle (in particular of the rear axle), in order thereby to achieve a certain steering effect. The division of the drive torque into different portions for the two wheels of a driven axle can be carried out here, for example, by means of a locking differential, as a result of which, in particular when a bend is traveled through, understeering or oversteering effects can be intentionally brought about. For example, the entire drive torque of the internal combustion engine can be diverted onto the wheel on the outside of the bend, since during rapid cornering with high centrifugal force acceleration the wheel on the inside of the bend is relieved of loading in terms of weight and therefore loses traction. In this way, in vehicles with an internal combustion engine, for example, an oversteering method can be brought about using a locking differential in that the drive torque is decisively shifted onto the wheel on the outside of the bend.

However, in the case of electrically driven vehicles with two electric motors which are actuated separately from one another, each of which is used to drive a half-axle, respectively assigned thereto, of a driven vehicle axle, a redistribution of the torque from the electric motor assigned to the wheel with less traction to the wheel with more traction is not possible. Instead, for example in the case of a bend which is being traveled through quickly, the wheel on the inside of the bend is relieved of loading, with the result that owing to the reduced traction of the wheel on the inside of the bend only the drive torque of the electric motor assigned to the wheel on the outside of the bend is available for accelerating the vehicle further. In other words, the torque which can be generated by the electric motor assigned to the wheel on the inside of the bend cannot be transmitted to the wheel on the outside of the bend, which results in comparatively high-performance electric motors having to be used in order to be able to intervene actively in the driving dynamics of the vehicle.

The invention is therefore based on the object of specifying a method for improving the driving dynamics of an electrically driven vehicle with two half-shafts which are each driven by an electric motor, wherein it is not intended that any particularly high-performance electric motors will be used to improve the driving dynamics.

SUMMARY OF THE INVENTION

This section provides a general summary of the disclosure, and is not a comprehensive disclosure of its full scope or all of its features.

This object is achieved by a method which has the features of claim 1.

In particular, the object on which the invention is based is achieved in a vehicle which has an axle with two half-shaft assemblies, wherein each half-shaft assembly comprises a half-shaft which is driven by an electric motor in order to drive a respective wheel, and the two half-shaft assemblies can be coupled selectively to one another in terms of drive by means of a torque transmission mechanism in the form of, for example, a clutch, in that at least one vehicle operating characteristic variable is monitored, wherein the torque transmission mechanism is engaged as a function of the monitored at least one vehicle operating characteristic variable.

In order, for example in the case of the driving scene of cornering as described above, to be able to at least partially transmit the torque generated by the electric motor assigned to the wheel on the inside of the bend to the wheel on the outside of the bend, it is therefore possible to carry out, for example, monitoring to determine whether a bend is currently being traveled through. This checking can be carried out, for example, by comparing the signal of a steering angle sensor and/or the signal of a yaw rate sensor with a respective reference value, wherein cornering is inferred if the reference value is exceeded by the sensor signal value. Equally, for example a measured or calculated centrifugal force acceleration can be monitored and compared with a reference value in order thereby to be able to detect whether or not a bend is currently being traveled through. If it is detected within the scope of such monitoring of the vehicle operating characteristic variable that a bend is currently being traveled through, the torque transmission mechanism, by means of which the two half-shaft assemblies can be coupled to one another, can then subsequently be engaged, which results in the torque which can be generated by the electric motor assigned to the wheel on the inside of the bend being able to be at least partly redistributed to the wheel on the outside of the bend.

Since the shifting of the torque as described from the wheel on the inside of the bend to the wheel on the outside of the bend is only possible, however, if the traction of the wheel on the inside of the bend is sufficiently reduced owing to the cornering, it is possible to monitor, as an additional vehicle operating characteristic variable, whether the bend is being traveled through at a sufficiently high speed which is adequate to relieve the loading of the wheel on the inside of the bend so that the torque which is generated by the electric motor assigned to the wheel on the inside of the bend is not transmitted, for example, directly to the roadway by means of the traction of the wheel on the inside of the bend but rather at least partially to the wheel on the outside of the bend by means of the engaged torque transmission mechanism, and only from there to the roadway.

As is apparent from the statement above, it may therefore be necessary to monitor a plurality of vehicle operating characteristic variables, wherein the torque transmission mechanism is engaged only when each of the monitored vehicle operating characteristic variables satisfies a respective condition. However, the decision to engage the torque transmission mechanism can also be based on just a single monitored vehicle operating characteristic variable, as is the case, for example, when the two half-shaft assemblies are to be coupled to one another by means of the torque transmission mechanism in order to relieve the thermal loading of one of the two electric motors. If, for example, a vehicle operating characteristic variable in the form of the temperature of one of the two electric motors exceeds a corresponding threshold value, the two half-shaft assemblies can be coupled to one another in terms of drive by means of the torque transmission mechanism, with the result that the electric motor which is more heavily thermally loaded can be relieved of loading by the electric motor which is less heavily thermally loaded.

As can be inferred from the statement above, it is possible for the at least one monitored vehicle operating characteristic variable to be a driving state value which is measured or a driving state value which is calculated by means of a vehicle model. However, a setpoint value or command value such as, for example, a requested setpoint torque which is requested by the driver can likewise also be used as a vehicle operating characteristic value. For example, the measured vehicle speed and/or a measured steering angle can be used as a measured driving state value, in order thereby to use these two measured driving state values as a basis in order to be able to make a definitive statement as to whether a bend is currently being traveled through in such a way that sufficient relieving of the loading of the wheel on the inside of the bend occurs, with the result that the torque which is generated by the electric motor assigned to the wheel on the inside of the bend can be at least partially transmitted to the wheel on the outside of the bend by engaging the torque transmission mechanism.

In addition, for example the thermal load of the electric motors, which can be measured or alternatively also calculated by forming models in a manner known per se, can be considered to be a measured driving state value. For example, the setpoint torque which is requested by the driver or the setpoint torque which is to be transmitted to the roadway by one of the vehicle wheels can be used as a further vehicle operating characteristic value as a function of which the torque transmission mechanism can be engaged.

For example, a driving dynamics controller can determine, on the basis of the setpoint torque requested by the driver, the vehicle speed, the steering angle and/or the state of yaw of the vehicle, which is to be understood as comprising the yaw angle, yaw speed and/or yaw acceleration, that the wheel on the outside of the bend is to transmit more torque to the roadway than the electric motor assigned to the wheel on the outside of the bend is capable of generating. Therefore, if, for example, during cornering it is detected that more torque is to be transmitted to the roadway via the wheel on the outside of the bend than the electric motor assigned to the wheel on the outside of the bend is capable of providing, the torque transmission mechanism can be engaged on the further condition of sufficient relieving of the loading of the wheel on the inside of the bend, with the result that by means of the engaged torque transmission mechanism, additional torque can be transmitted to the wheel on the outside of the bend by the electric motor assigned to the wheel on the inside of the bend.

In the text which follows, details will now be given on preferred embodiments of the invention. Further embodiments can result from the dependent claims, the description of the figures and the drawings.

Therefore, according to one embodiment there is provision that the torque transmission mechanism is engaged as soon as at least one vehicle operating characteristic variable exceeds or undershoots an associated reference value. If, for example, it has been detected that a bend is currently being traveled through sufficiently quickly that relieving of the loading on the wheel on the inside of the bend, and therefore acceleration thereof, occurs, the torque transmission mechanism can be engaged at a time at which the rotational speed of the wheel on the inside of the bend corresponds essentially to the rotational speed of the wheel on the outside of the bend. In this case, a vehicle operating characteristic variable is therefore the rotational speed of the wheel on the inside of the bend, whereas the associated reference value is the rotational speed of the wheel on the outside of the bend. If the associated reference value is reached, the torque generation of at least one of the two electric motors can then subsequently be changed in comparison with the torque generation by said motor before the reference value is reached. After the engagement of the torque transmission mechanism, the torque generation of the electric motor assigned to the wheel on the inside of the bend can therefore, for example, be increased in order thereby to assist the electric motor assigned to the wheel on the outside of the bend in satisfying the torque to be transmitted to the roadway by means of the wheel on the outside of the bend.

So that no constraints or stresses occur in the drive train owing to the engagement of the torque transmission mechanism, according to a further embodiment there may be provision that during cornering the torque transmission mechanism is engaged only when the rotational speed of the wheel on the inside of the bend corresponds at least essentially to the rotational speed of the wheel on the outside of the bend during cornering. There is therefore an adjustment and synchronization of the wheel rotational speed, which can cause the torque transmission mechanism itself to be engaged under load without undesired constraining effects occurring. Subsequently, the generation of torque of the electric motor assigned to the wheel on the inside of the bend, in order to satisfy the setpoint torque to be transmitted to the roadway by means of the wheel on the outside of the bend can then be increased. Even if the torque which can be generated by the electric motor assigned to the wheel on the outside of the bend were to be adequate to be able to satisfy the torque to be transmitted to the roadway by means of the wheel on the outside of the bend, the torque which can be generated by the electric motor assigned to the wheel on the inside of the bend can be increased after the previously described rotational speed synchronization of the two wheels, since this permits thermal relieving of loading and/or a reduction in the torque of the electric motor assigned to the wheel on the outside of the bend.

According to a further embodiment, the monitoring of the at least one vehicle operating characteristic variable can additionally comprise checking to determine whether the torque generation requested by the electric motor assigned to the wheel on the outside of the bend reaches a reference value, for example the setpoint torque to be transmitted to the roadway by means of the wheel on the outside of the bend or the maximum torque of the electric motor. In this case, the reduction in torque which is requested by the electric motor assigned to the wheel on the inside of the bend can be increased if within the scope of the checking it is detected that the torque generation requested by the electric motor assigned to the wheel on the outside of the bend has reached the reference value and the torque transmission mechanism is not engaged until the rotational speed of the wheel on the inside of the bend corresponds at least essentially to the rotational speed of the wheel on the outside of the bend owing to the increase in the torque generation of the electric motor assigned to the wheel on the inside of the bend. Therefore, in this embodiment, before the engagement of the torque transmission mechanism the torque generation of the electric motor assigned to the wheel on the inside of the bend is firstly increased, as a result of which faster adjustment of the rotational speeds of the wheels occurs owing to the traction of the wheel on the inside of the bend, which is reduced during cornering, with the result that the torque transmission mechanism can be engaged all the more earlier without constraints.

As can be inferred from the above embodiments, the method according to the invention is therefore aimed at ensuring that owing to the engagement of the torque transmission mechanism, the torque which is generated, for example, by the electric motor assigned to the wheel on the inside of the bend is transmitted to the wheel on the outside of the bend. However, in order to permit such a distribution of torque there is a need for relieving of loading or of a reduction in the traction of the wheel on the inside of the bend, which can be detected on the basis of different vehicle operating characteristic variables such as, for example, the bend radius, the steering angle, the vehicle speed and/or the centrifugal force acceleration, in order to mention only a few of the vehicle operating characteristic variables which are relevant in respect of the relieving of loading on the wheel on the inside of the bend. Such vehicle operating characteristic variables can at least partially influence one another, with the result that, for example on the basis of a characteristic diagram which has the relevant vehicle operating characteristic variables as input parameters and forms relationships between them, it is possible to make a decision as to whether sufficient relieving of loading of the wheel on the inside of the bend occurs to be able to achieve the desired distribution of torque through engagement of the torque transmission mechanism.

As has already been explained above, the method according to the invention is also suitable for relieving the thermal loading of one of the two electric motors. For this purpose, the monitoring of the at least one vehicle operating characteristic variable comprises monitoring the thermal load for at least one of the two electric motors and the comparison of the thermal load of the one and/or of the other electric motor and/or the difference between the thermal loads of the two electric motors with a respective reference value for a thermal load. When this comparison, if is made it is detected that the thermal load of the one and/or of the other electric motor and/or the difference between the thermal loads of the two electric motors exceed/exceeds a respective reference value for a thermal load, the torque transmission mechanism can subsequently be engaged, with the result that the more heavily thermally loaded electric motor can be relieved of loading by the less heavily thermally loaded electric motor.

For example, the torque generation of the more heavily thermally loaded electric motor can be reduced and the torque generation of the less heavily thermally loaded electric motor can be increased, bringing about a reduction in the thermal load of the electric motor which was more heavily thermally loaded at one time. In this context, the reduction in the torque generation of the electric motor which is more heavily thermally loaded and/or the increase in the torque generation of the electric motor which is less heavily thermally loaded are/is preferably regulated in such a way that the both electric motors are thermally loaded to the same degree.

Wherever the term thermal load is mentioned here, it can involve in this context a measured or a calculated temperature of the respective electric motor, wherein it proves advantageous to consider, for the thermal load of the respective electric motor, a chronological profile of the engine temperature which is acquired by a measurement or calculation. For example, in order to determine the thermal load of the respective electric motor it is possible to calculate a sliding mean value of the actual temperature or to form integrals of the actual temperature of the respective electric motor, in order to prevent an otherwise unnecessary distribution of torque between the two electric motors occurring owing to brief thermal peaks.

Since within the scope of the described relieving of the thermal loading of a heavily thermally loaded electric motor, a torque transfer from the electric motor assigned to the one wheel occurs to the other wheel owing to the engagement of the torque transfer mechanism, it can prove advantageous to engage the torque transfer mechanism for relieving the thermal loading of an electric motor only when, within the scope of the monitoring of the at least one vehicle operating characteristic variable, it is detected that the vehicle is essentially in a straight-ahead travel mode, as can in turn be detected, for example, on the basis of measured and/or calculated steering angles or centrifugal forces. If, on the other hand, it is detected during cornering that, for example, the wheel on the outside of the bend has a high thermal load and the wheel on the inside of the bend is sufficiently relieved of loading, in order to satisfy a high torque which is to be transmitted to the roadway by means of the wheel on the outside of the bend the torque generation of the electric motor assigned to the wheel on the inside of the bend can be increased disproportionately. At the same time, the torque generation of the electric motor assigned to the wheel on the outside of the bend can be reduced in order to reduce its thermal load without this occurring at the expense of the torque which is transmitted to the roadway by means of the wheel on the outside of the bend, since the torque generation of the electric motor assigned to the wheel on the inside of the bend is increased "disproportionately", i.e. to a degree that takes into account the reduction in the torque generation of the electric motor assigned to the wheel on the outside of the bend.

According to yet a further embodiment, the monitoring of the at least one vehicle characteristic variable can comprise checking to determine whether a bend is being traveled through and whether a load change from tractive mode to overrun mode is present, wherein in the case of such a load change the torque transmission mechanism is at least partially engaged. While a bend is being traveled through quickly, specifically the electric motor assigned to the wheel on the outside of the bend can develop a braking torque, whereas owing to the reduced traction of the wheel on the inside of the bend the electric motor assigned to the same wheel does not develop any braking torque, or only a low braking torque, as a result of which during the load change a turn-in reaction of the vehicle can occur. In order to counteract such a turn-in reaction, in the case of a load change from tractive mode to overrun mode during cornering the torque transmission mechanism is therefore at least partially engaged, since as a result the vehicle is "pulled straight", which occurs owing to the fact that the engagement of the torque transmission mechanism of both electric motors brings about a braking torque which is transmitted to the wheel on the outside of the bend by means of the engaged torque transmission mechanism, and is transmitted from said wheel to the roadway. As a result of the engagement of the torque transmission mechanism, by regulating the yaw damping can therefore be forcibly brought about, wherein the an extent of yaw damping can be selectively set to a desired value by regulating the degree of engagement of the torque transmission mechanism and/or by regulating the torque generation by at least one of the two electric motors.

The checking as to whether a load change from tractive mode to overrun mode occurs can be carried out, for example, by comparing a change in an accelerator pedal position signal with a reference value: if, for example on a roadway which is not inclined, the position of the accelerator pedal is reduced starting from an activated position to zero, both electric motors no longer generate any torque and the vehicle continues its movement purely on the basis of its mass inertia, as a result of which a load change from traction to thrust occurs, wherein the two electric motors then develop a braking torque. If, on the other hand, the accelerator pedal position is reduced only partially, a definitive statement as to whether a load change occurs cannot be made solely on the basis of the accelerator pedal position, for which reason, in a manner known per se, further vehicle operating characteristic variables have to be checked and, if appropriate, compared with associated reference values in order to be able to make a definitive statement as to whether a load change from tractive mode to overrun mode occurs. A reliable definitive statement as to whether a load change from tractive mode to overrun mode occurs can additionally be made by virtue of the fact that the voltage which is generated by at least one of the electric motors is monitored as a vehicle operating characteristic variable, wherein it can be inferred that a load change has taken place if the monitored voltage exceeds a predeterminable threshold value or reference value.

As can be inferred from the description above, at least one vehicle operating characteristic variable must satisfy an associated condition for the torque transmission mechanism to be engaged. If, on the other hand, at least one vehicle operating characteristic variable no longer satisfies at least one condition which is taken into account for the engagement of the torque transmission mechanism, the torque transmission mechanism between the two half-shafts is disengaged again so that the two electric motors can be actuated independently of one another again during the normal driving mode by a vehicle dynamics controller.

According to a further aspect, according to the invention a drive device for a vehicle is furthermore provided, which has an axle with two half-shaft assemblies, wherein each half-shaft assembly comprises a half-shaft which is driven by an electric motor for driving a respective wheel, wherein the axle also has a torque transmission mechanism in the form of, for example, a clutch which is designed to selectively couple the two half-shaft assemblies to one another in terms of drive, and wherein the drive device also comprises a control device which is configured to control the torque transmission mechanism in accordance with one of the methods described above.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

Figure 1:
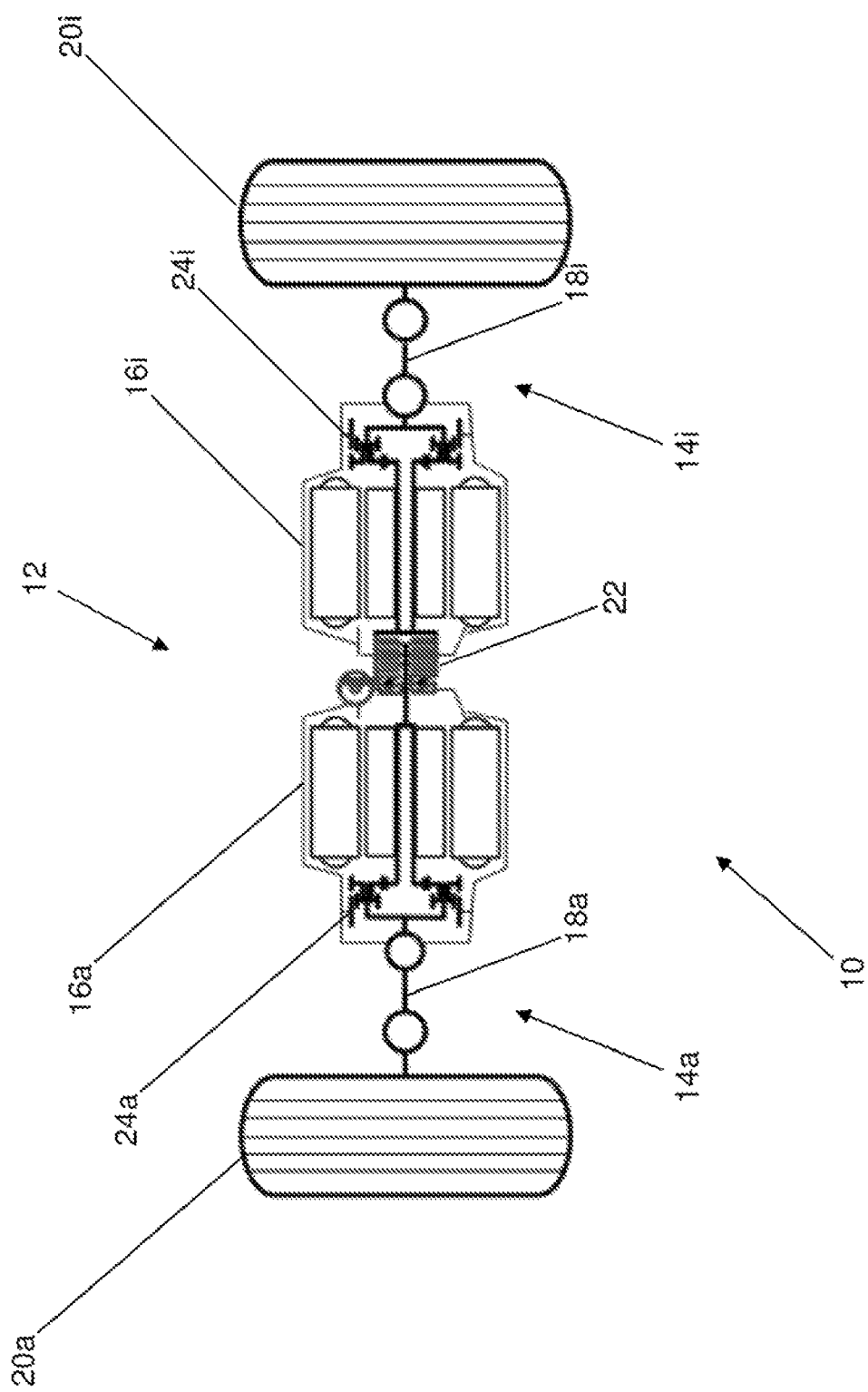
FIG. 1 shows a drive device for a vehicle with which the method according to the invention can be carried out.

In the text which follows, a drive device 10 is firstly described with reference to FIG. 1, which drive device is designed to be able to carry out the method according to the invention in its different embodiments. The drive device 10 can preferably assume the form of a rear axle 12 of a vehicle and be installed as a rear axle in a vehicle.

In the embodiment illustrated, the drive device 10 has two half-shaft assemblies 14a, 14i. Each of these half-shaft assemblies 14a, 14i has here a half shaft 18a, 18i which can be composed of a plurality of cardan shaft sections. Furthermore, each half-shaft assembly 14a, 14i has a respective electric motor 16a, 16i for driving the respectively associated half-shaft 18a, 18i and/or for driving the respectively associated wheel 20a, 20i of the respective half-shaft assembly 14a, 14i. In the illustrated embodiment, a planetary gear mechanism 24a, 24i is intermediately connected in the force action path between the respective electric motor 16a, 16i and the respective wheel 20a, 20i, in order thereby to be able to bring about multiplication of the torque which can be generated by the respective electric motor 16a, 16i.

Moreover, the drive device 10 has a torque transmission mechanism 22, which in the illustrated embodiment can be a wet or dry multi-disk clutch, wherein alternatively thereto a powershift dog clutch can also be used. The torque transmission device 22 can therefore be a frictionally locking or positively locking clutch by means of thereto the two half-shaft assemblies 14a, 14i can be selectively coupled to one another in terms of drive, in order thereby to be able to bring about in the desired fashion a distribution of torque from the one half-shaft assembly 14a, 14i to the respective other half-shaft assembly 14i, 41a, as will be explained in more detail below.

Although in the illustrated embodiment the two electric motors 16a, 16i are concentric with the respective half-shaft 18a, 18i and the torque transmission mechanism 22 couples the rotor shafts of the two electric motors 16a, 16i to one another, embodiments are also possible in which the respective electric motor 16a, 16i is arranged eccentrically in relation to the respective half-shaft 18a, 18i and drives the latter, for example, by means of a spur gear mechanism, wherein in this case the half-shafts 18a, 18i themselves (and not for example the engine rotor shafts) can be coupled to one another by means of the torque transmission mechanism 22.

Furthermore, the drive device 10 has a control device (not illustrated here) which is specifically configured to control the torque transmission mechanism 22 according to the method according to the invention, as is explained in detail below. The control device can be a superordinate driving dynamics controller which controls not only the torque transmission mechanism 22 but also, for example, the electric motors 16a, 16i.

Figure 2A:
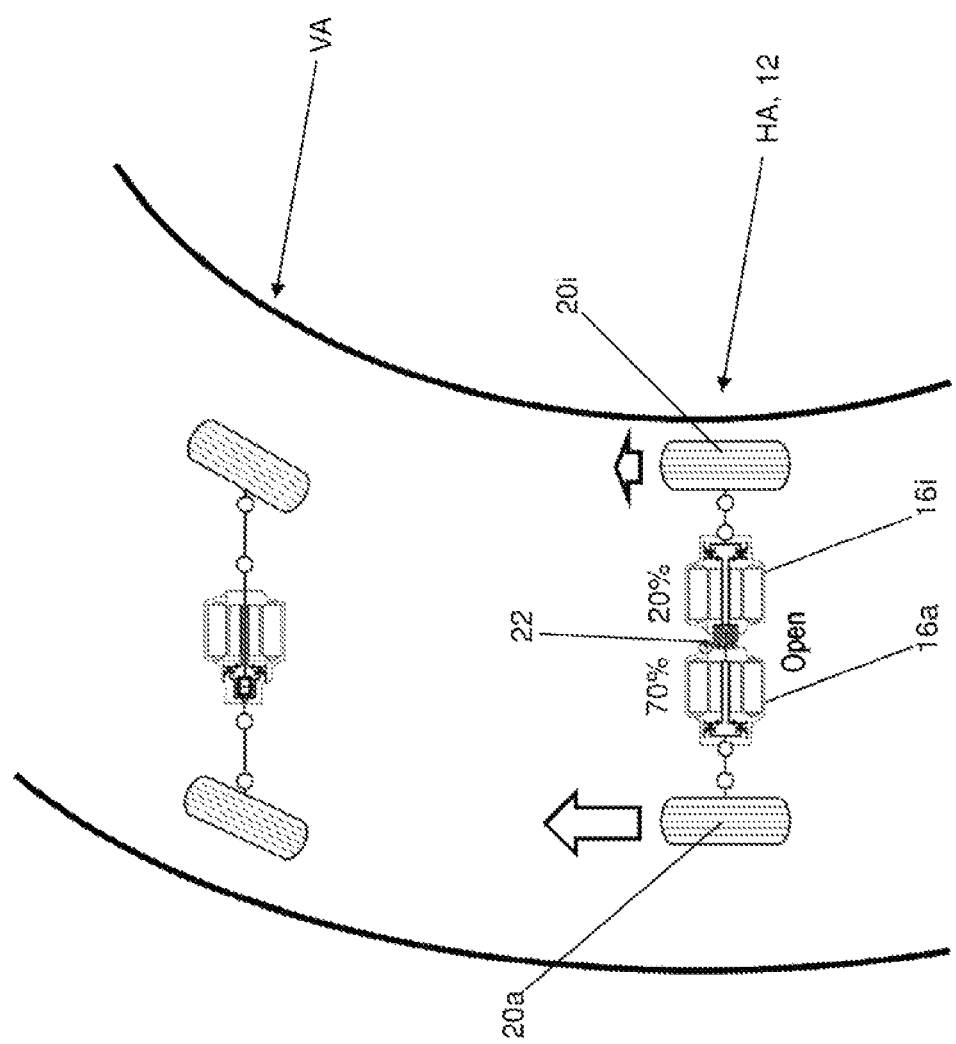
FIGS. 2a and 2b show the transition from a first driving situation to a second driving situation, wherein an oversteering effect can be achieved by engaging the torque transmission mechanism.
Figure 2B:
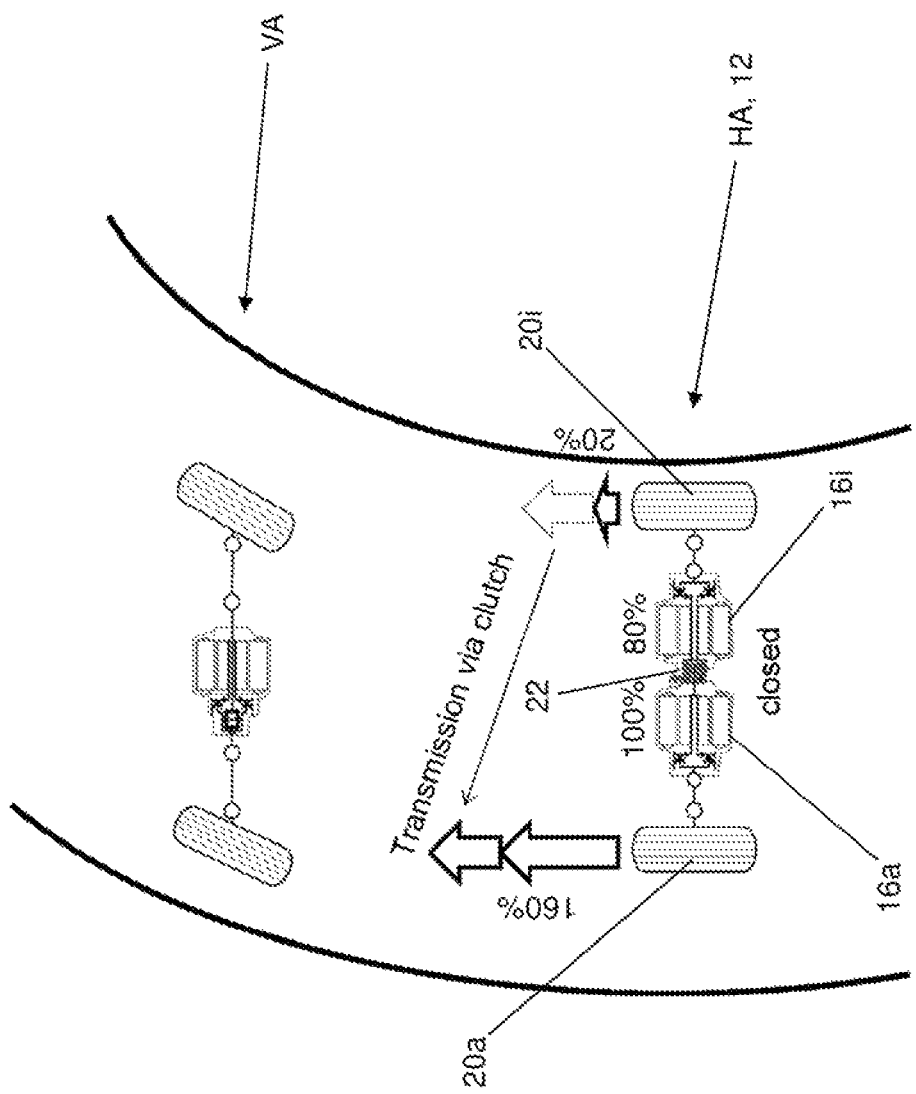

In the text which follows, there is now a description, with reference to FIGS. 2a and 2b, of how a torque vectoring effect can be achieved using the drive device according to the invention, specifically, in particular, when the torque which can be generated by one of the electric motors 16a, 16i is not sufficient to generate a torque which is to be applied to the roadway by means of the associated wheel 20a, 20i.

The above illustration in FIG. 2a shows a schematic illustration of a vehicle, of which only the steerable front axle VA and the non-steerable rear axle HA formed by the drive device 10 according to the invention, are illustrated here. In the above illustration in FIG. 2a, a driving situation is illustrated in which the vehicle is traveling through a right-handed bend, wherein in order to satisfy the driving dynamics requirements the electric motor 16a on the outside of the bend provides 70% of its maximum torque, and the electric motor 16i on the inside of the bend provides 20% of its maximum torque. In this driving situation, the torque transmission mechanism 22 is open or disengaged, since the setpoint torque which is to be provided by the respective electric motor 16a, 16i can be applied.

The torque transmission mechanism 22 can remain disengaged here until, for example in order to satisfy driving dynamics requirements, more torque is to be applied to the roadway by means of the wheel 20a on the outside of the bend than the electric motor 16a on the outside of the bend is capable of applying alone. Such a driving situation is illustrated in FIG. 2b in which the aim is to apply 160% of the maximum torque of each of the two electric motors 16a, 16i to the roadway by means of the wheel 20a on the outside of the bend. The torque which is to be transmitted to the roadway by means of the wheel 20a on the outside of the bend and the wheel 20i on the inside of the bend can be determined in this case, for example, on the basis of the setpoint torque requested by the driver, the vehicle speed, the steering angle and/or the state of yaw of the vehicle. Since in this case the maximum torque of the electric motor 16a on the outside of the bend is alone not sufficient to be able to satisfy the torque request at the wheel 20a on the outside of the bend, additional torque is requested by the electric motor 16i assigned to the wheel 20i on the inside of the bend, as can be seen in the bottom illustration in FIG. 2b, according to which the electric motor 16i on the inside of the bend now generates 80% of its maximum torque. However, in order to be able to transmit this torque at least partially to the wheel 20a on the outside of the bend, the torque transmission mechanism 22 must be engaged.

However, during cornering the wheel 20i on the inside of the bend basically has a lower rotational speed than the wheel 20a on the outside of the bend, with the result that undesired constraints or stress effects as well as effects which are difficult to handle in terms of driving dynamics can occur if the torque transmission mechanism 22 is engaged without taking into account the vehicle operating characteristic variables which are present in the respective driving situation.

According to the invention there is therefore provision that the torque transmission mechanism 22 is engaged as a function of at least one monitored vehicle operating characteristic variable. For example, the speed and the steering angle can be acquired as vehicle operating characteristic variables, since they can be used not only to detect whether cornering is present but also to detect whether the bend is being traveled through quickly enough, so that, owing to the centrifugal forces occurring during cornering, the wheel 20i on the inside of the bend is relieved of loading to such an extent that its rotational speed increases owing to the now reduced traction, as is desired, so that the torque transmission mechanism 22 can be engaged without constraints. Therefore, the wheel rotational speeds of the wheel 20i on the inside of the bend and of the wheel 20a on the outside of the bend and/or the corresponding engine rotational speeds are monitored as a further vehicle operating characteristic variable, wherein the torque transmission mechanism 22 is not engaged until the rotational speed of the wheel 20i on the inside of the bend corresponds at least essentially to the rotational speed of the wheel 20a on the outside of the bend. In this respect, the rotational speed of the wheel 20a on the outside of the bend serves as a reference value for the rotational speed of the wheel 20i on the inside of the bend, and when said reference value is reach the torque transmission mechanism 22 is engaged.

This state is illustrated in FIG. 2b in which the electric motor 16i on the inside of the bend generates 80% of its maximum torque, wherein owing to reduced traction only 20% is transmitted to the roadway by means of the wheel 20i on the inside of the bend, and the remaining 60% is transmitted to the roadway owing to the engaged torque transmission mechanism 20.

In the driving situation described above, the increase in the rotational speed of the wheel 20i on the inside of the bend results, inter alia, from the increase in the torque generation of the motor 16i on the inside of the bend before the engagement of the torque transmission mechanism 22. However, if the bend is traveled through quickly enough, the rotational speed of the wheel 20i on the inside of the bend can also increase solely on the basis of the traction loss brought about by the centrifugal force, to the extent that it corresponds essentially to the rotational speed of the wheel 20a on the outside of the bend. In this scenario, the torque generation by motor 16i on the inside of the bend can also be increased to 80% of its maximum torque only after the engagement of the torque transmission mechanism.

The method according to the invention can additionally use, as a further vehicle operating characteristic variable, for example the thermal load of the electric motors 16a, 16i, in order thereby to ensure, in the case of a thermal overload of an electric motor 16a, 16i, thermal compensation by engagement of the torque transmission mechanism 22, as is explained with reference to FIG. 3. In the driving situation illustrated in FIG. 3, the vehicle is in a straight-ahead travel mode, as can be detected, for example, on the basis of the steering angle as a vehicle operating characteristic variable. Assuming identical traction of the right-hand wheel 20i and the left-hand wheel 20a, in the illustrated driving situation 45% of the maximum torque of the respective motor 16i, 16a is to be transmitted to the roadway by means of the respective wheel. If it is then detected within the scope of the monitoring of the thermal load of the two electric motors 16i, 16a that, for example, the electric motor 16a assigned to the left-hand wheel 20a risks overheating, the torque transmission mechanism 22 is at least partially engaged, which permits the torque generation of the electric motor 16a assigned to the left-hand wheel 20a to be reduced to, for example, 20% of its maximum torque, in order, on the contrary, to increase the torque generation of the other electric motor 16i to 70%. Relieving of the thermal loading of the electric motor 16i assigned to the left-hand wheel 20a therefore occurs, and the differential torque, which is not applied by the electric motor $16_a$ assigned to the left-hand wheel 20a, is applied at a level of 25% by the other electric motor 16i and is transmitted to the left-hand wheel 20a by means of the engaged torque transmission mechanism 22.

Figure 3:
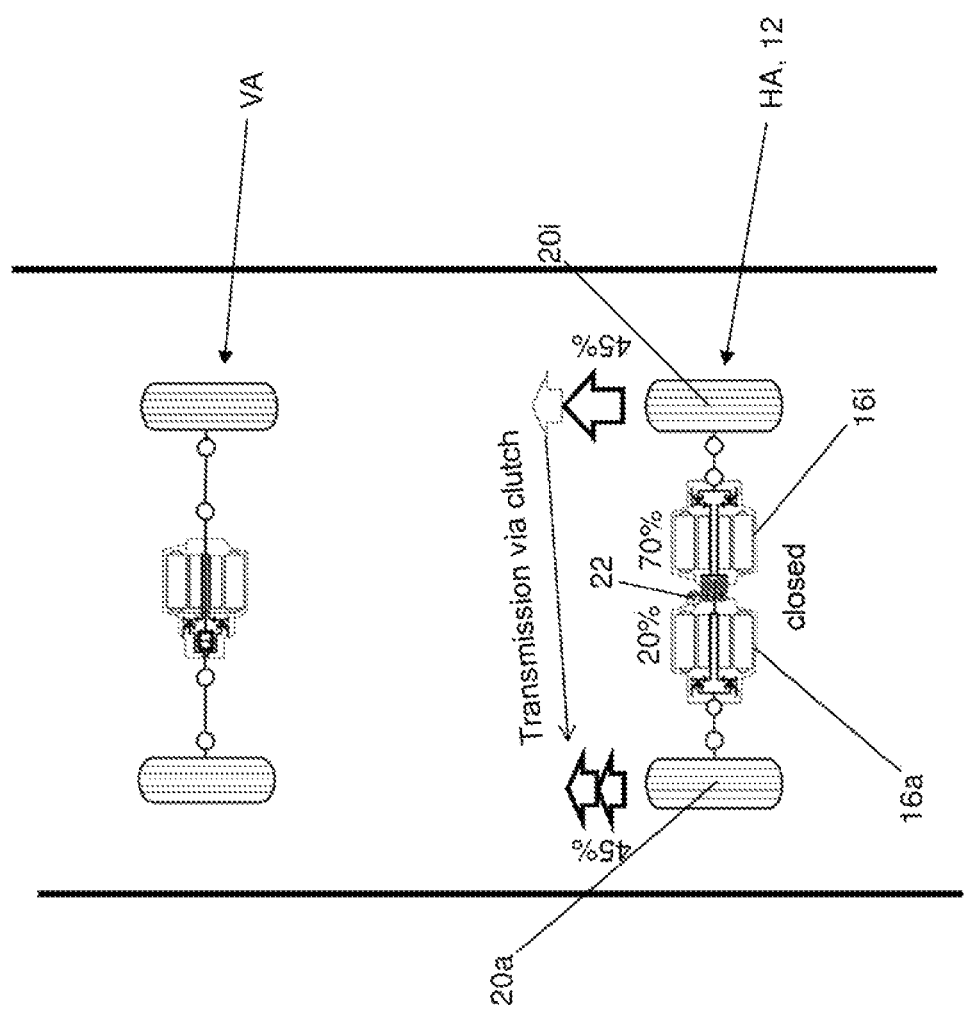
FIG. 3 illustrates a driving situation in which relieving of the thermal loading of an electric motor can be achieved by engaging the torque transmission mechanism.

In the driving situation in FIG. 3, the torque transmission mechanism 22 is therefore also engaged as a function of a monitored vehicle operating characteristic variable in the form of the thermal load on the motors 16a, 16i. In this context, for example a measured or calculated engine temperature can be used as a measure of the thermal load, wherein the temperature which is determined in this way should preferably be considered over a relatively long time period as a sliding mean value formation, to eliminate brief temperature peaks. Whether the thermal load of one of the two motors 16a, 16i justifies the engagement of the torque transmission mechanism 22 can be checked by virtue of the fact that the thermal load of the one and/or of the other electric motor and/or the difference between the thermal loads of the two electric motors 16a, 16i is compared with a respective reference value for a thermal load. The torque transmission mechanism 22 can therefore be engaged, for example, if the thermal load of just one electric motor 16a, 16i exceeds a predetermined threshold value or if the thermal load of the one electric motor 16a is higher than the thermal load of the other electric motor 16i by a predetermined degree.

Figure 4:
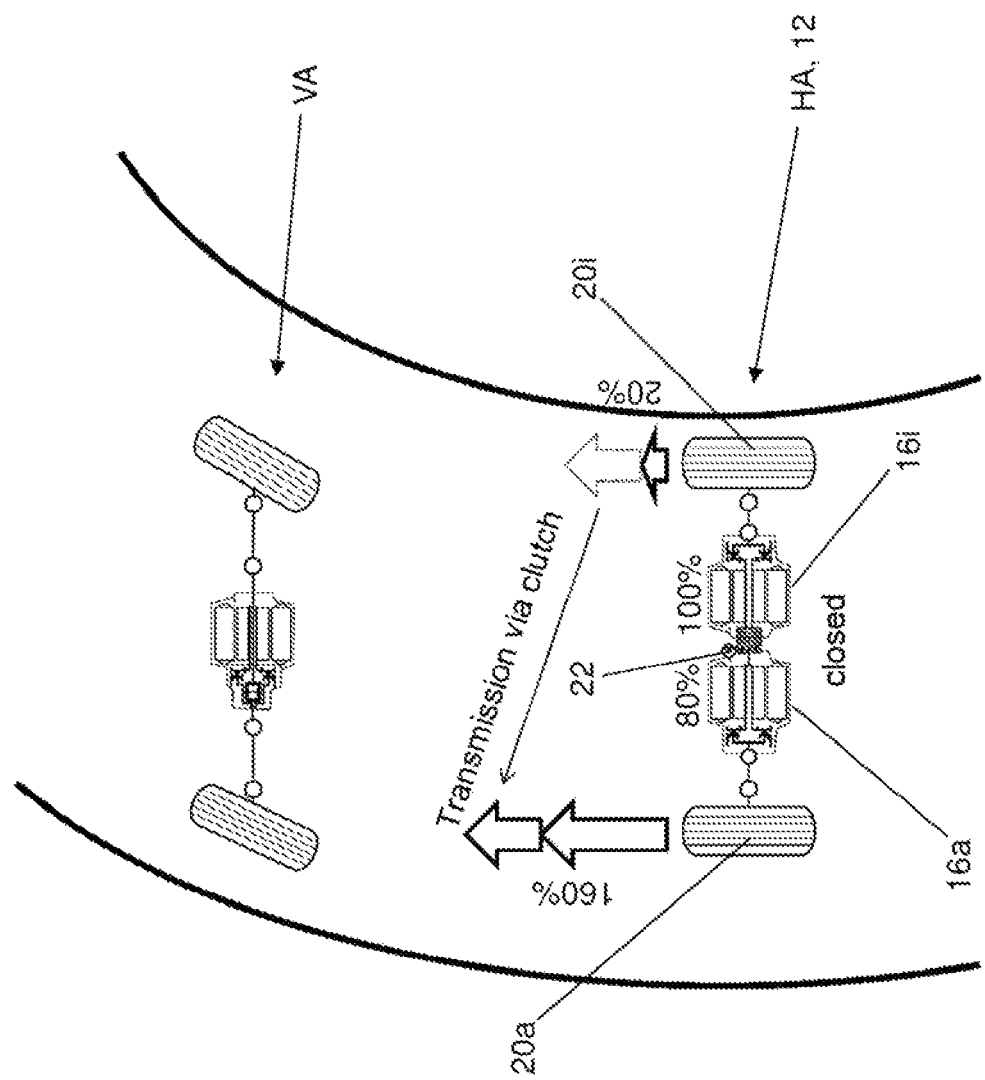
FIG. 4 illustrates a driving situation in which both an oversteering effect and relieving of the thermal loading of an electric motor can be achieved by engaging the torque transmission mechanism.

As is illustrated in FIG. 4, the thermal compensation described above can also be combined during cornering with the torque vectoring function described above with reference to FIGS. 2a and 2b, if, for example during cornering, it is detected within the scope of the monitoring of the thermal load of the two electric motors 16a, 16i that the electric motor 16a on the outside of the bend risks overheating, as can be the case on circuits or handling courses on which the proportion of right-hand or left-hand bends is disproportionate. In this case, the electric motor 16a on the outside of the bend is actuated in such a way that it generates only 80% of its maximum torque, whereas the remaining 80% for satisfying the torque (160%) which is to be transmitted to the roadway by means of the wheel 20a on the outside of the bend is applied by the electric motor 16i assigned to the wheel 20i on the inside of the bend and is transmitted to the wheel 20a on the outside of the bend by means of the engaged torque transmission mechanism.

Figure 5:
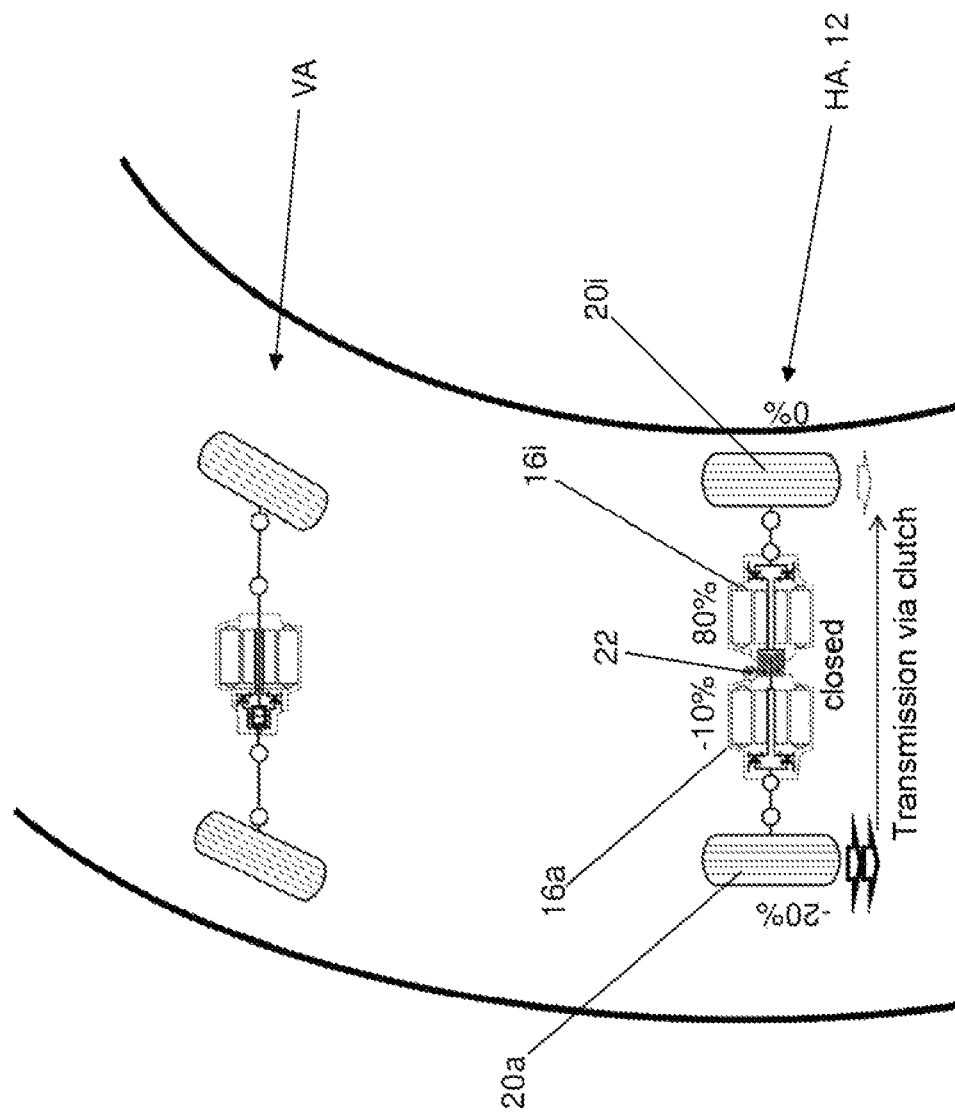
FIG. 5 illustrates a driving situation in which an extent of yaw damping can be achieved by engaging the torque transmission mechanism.

With reference to FIG. 5, a further driving situation is explained in which the vehicle can be stabilized in the case of a load change from tractive mode to overrun mode during cornering by using the method according to the invention. Usually, in fact, vehicles exhibit a turn-in reaction if a load change from tractive mode to overrun mode takes place during cornering. In order to counter such a load change reaction it is provided according to the invention that during cornering suitable vehicle operating characteristic variables such as, for example, the accelerator pedal position are continuously monitored to determine whether a load change from tractive mode to overrun mode occurs, as is the case, for example, when the foot is taken off the accelerator pedal, with the result that in reaction thereto the torque transmission mechanism 22 is engaged as a function of the vehicle operating characteristic variable which indicates a load change.

In the driving situation illustrated in FIG. 5, in this context the bend is being traveled through so quickly that relieving of the loading on the wheel 20i on the inside of the bend occurs, with the result that no braking torque, such as can be basically applied by the electric motors 16a, 16i, can be transmitted to the roadway by means of said wheel 20i. Nevertheless, the braking resistance of the electric motor 16i assigned to the wheel 20i on the inside of the bend can be utilized in that in the case of a load change from tractive mode to overrun mode the torque transmission mechanism 22 is engaged, since this results in not only the braking torque of the electric motor 16a assigned to the wheel 20a on the outside of the bend acting on the wheel 20a on the outside of the bend but also that of the other electric motor 16i also acting, as a result of which during the cornering the vehicle can be pulled straight again. In this context the degree of engagement of the torque transmission mechanism 22 and/or the torque generation of the electric motors 16a, 16i is preferably selectively regulated, as a result of which a desired extent of yaw damping can be achieved.

LIST OF REFERENCE SYMBOLS

10 Drive device
12 Axle
14a Half-shaft assembly
14i Half-shaft assembly
16a Electric motor
16i Electric motor
18a Half-shaft
18i Half-shaft
20a Wheel
20i Wheel
22 Clutch
24a Planetary gear mechanism
24i Planetary gear mechanism
VA Front axle
HA Rear axle

The invention claimed is:

1. A method for modifying the driving dynamics of an electrically driven vehicle which has an axle with two half-shaft assembly wherein each half-shaft assembly comprises a half-shaft which is driven by an electric motor in order to drive a respective wheel, and the two half-shaft assemblies can be coupled selectively to one another in terms of drive by means of a torque transmission mechanism, wherein the method comprises:
    monitoring at least one vehicle operating characteristic variable; and
    engaging the torque transmission mechanism as a function of the monitored at least one vehicle operating characteristic variable;
    wherein the monitoring of the at least one vehicle operating characteristic variable comprises checking to determine whether a bend is traveled through, wherein the torque transmission mechanism is engaged only if the travel through a bend is detected in the scope of the checking, and the rotational speed of the wheel on the inside of the bend corresponds at least to the rotational speed of the wheel on the outside of the bend.

2. The method according to claim 1, wherein the torque transmission mechanism is engaged if the monitored at least one vehicle operating characteristic variable reaches an associated reference value.

3. The method according to claim 1, wherein the torque generation of at least one of the two electric motors is changed compared to its torque generation before the reference value is reached if the monitored at least one vehicle operating characteristic variable reaches the associated reference value.

4. The method according to claim 1, wherein the torque generation of the electric motor assigned to the wheel on the inside of the bend is increased if after the engagement of the torque transmission mechanism it is detected that the torque generation requested by the electric motor assigned to the wheel on the outside of the bend reaches a reference value.

5. The method according to claim 1, wherein the monitoring of the at least one vehicle operating characteristic variable also comprises checking to determine whether the torque generation requested by the electric motor assigned to the wheel on the outside of the bend reaches a reference value, wherein the torque generation of the electric motor which is assigned to the wheel on the inside of the bend is increased if within the scope of the checking it is detected that the torque generation which is requested by the electric motor assigned to the wheel on the outside of the bend has reached the reference value and the torque transmission mechanism is not engaged until the rotational speed of the wheel on the inside of the bend corresponds at least to the rotational speed of the wheel on the outside of the bend owing to the increase in the torque generation of the electric motor assigned to the wheel on the inside of the bend.

6. The method according to claim 5, wherein the torque generation which is requested by the electric motor assigned to the wheel on the outside of the bend is generated as a function of at least one vehicle speed, one steering angle and one state of yaw of the vehicle.

7. The method according to claim 1, wherein the monitoring of the at least one vehicle operating characteristic variable comprises monitoring a thermal load for at least one of the two electric motors and the comparison of the thermal load of the one and/or of the other electric motor and/or the difference between the thermal loads of the two electric motors with a respective reference value for a thermal load, wherein in the event of the thermal load of the one and/or of the other electric motor and/or the difference between the thermal loads of the two electric motors exceeding a respective reference value for a thermal load, the torque transmission mechanism is engaged.

8. The method according to claim 7, wherein the monitoring of the at least one vehicle operating characteristic variable also comprises checking to determine whether the vehicle is at least travelling straight ahead.

9. The method according to claim 7, wherein the monitoring a thermal load for at least one of the two electric motors comprises monitoring the thermal load for the two electric motors, wherein the reduction in the torque generation of the electric motor which is more heavily thermally loaded and/or the increase in the torque generation of the electric motor which is less heavily thermally loaded are/is regulated in such a way that both electric motors are thermally loaded to the same degree.

10. The method according to claim 7, wherein the monitoring of the at least one vehicle operating characteristic variable comprises checking to determine whether a bend is traveled through and whether a load change from tractive mode to overrun mode is present; wherein in the event of a positive test result the torque transmission mechanism is at least partially engaged.

11. The method according to claim 10, wherein the degree of engagement of the torque transmission mechanism is regulated in order to achieve a desired extent of yaw damping.

12. The method according to claim 10, wherein the torque generation of at least one of the two electric motors is regulated in order to achieve a desired extent of yaw damping.

13. The method according to claim 1, wherein the torque transmission mechanism is disengaged again as soon as the monitored at least one vehicle operating characteristic variable no longer satisfies at least one condition which is taken into account for engagement of the torque transmission mechanism.

14. A drive device for a vehicle, which has an axle with two half-shaft assemblies wherein each half-shaft assembly comprises a half-shaft which is driven by an electric motor, for driving a respective wheel, wherein the axle also has a torque transmission mechanism which is designed to selectively couple the two half-shaft assemblies to one another in terms of drive, and wherein the drive device also comprises a control device which is designed to control the torque transmission mechanism in accordance with the method according to claim 1.

\* \* \* \* \*